United States Patent Office 3,434,087
Patented Mar. 18, 1969

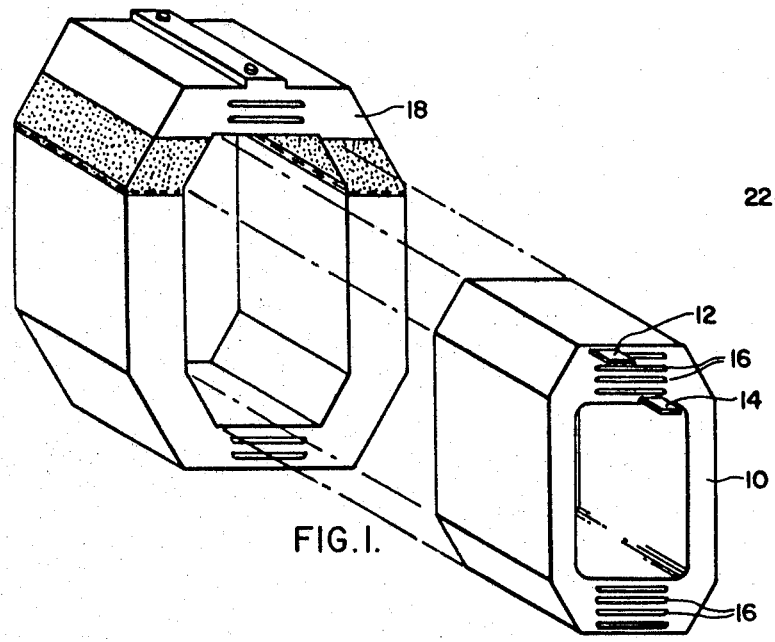
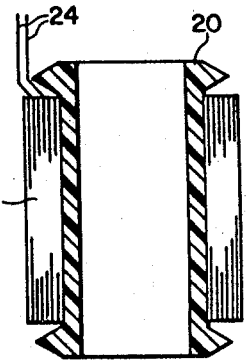
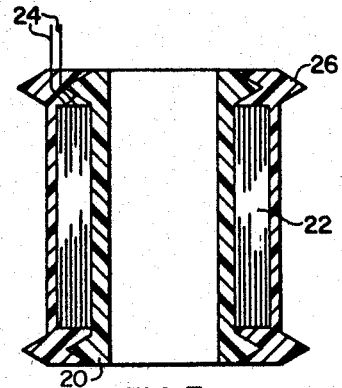
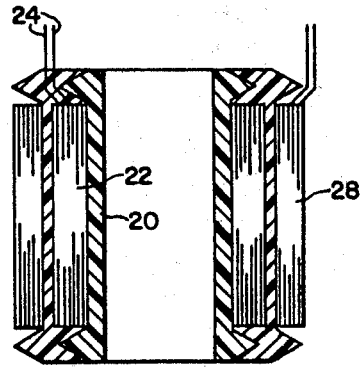
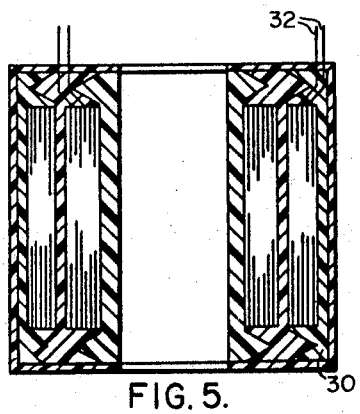
INVENTOR
Charles F. Hofmann

3,434,087
CRACK-RESISTANT CASTING COMPOSITION
Charles F. Hofmann, Monroeville, Pa., assignor to Westinghouse Electric Corporation, Pittsburgh, Pa., a corporation of Pennsylvania
Filed June 12, 1967, Ser. No. 645,320
U.S. Cl. 336—96         12 Claims
Int. Cl. C08g 51/04, 30/00; H01f 27/32

ABSTRACT OF THE DISCLOSURE

A resinous casting composition for encapsulating an electrical apparatus composed of not more than about 35% of an epoxy resinous composition and of more than about 65% of a selected filler having a predetermined particle size distribution. Said composition is characterized by a low viscosity when unpolymerized, and an unusually low coefficient of thermal expansion of as low as $10 \times 10^{-6}$ and lower when cured.

CROSS REFERENCES TO RELATED APPLICATIONS

This application is related to applications Serial Nos. 447,237 and 456,038, filed April 12, 1965, and May 6, 1965, respectively, application Serial No. 406,104, filed October 23, 1964, and all abandoned, and application Serial No. 645,319, filed June 12, 1967.

BACKGROUND OF THE INVENTION

Field of the invention

This invention relates to mineral filler compositions adapted for use in epoxy liquid resinous casting materials which compositons include certain selected finely divided mineral fillers of a predetermined particle size which are conducive to exceptionally high loading of the liquid epoxy resins for use as insulating materials for electrical apparatus. The invention also relates to cured rigid resinous insulating composition produced therefrom, having a high percentage of mineral filler, and electrical apparatus encapsulated therein, the cured composition characterized by an unusually low coefficient of thermal expansion.

Description of the prior art

The encapsulation of electrical apparatus with resinous insulating compositions has been practiced in the art for many years. The practice has been beset by numerous problems stemming mainly from the operation of the insulated electrical apparatus. That is particularly true with electrical apparatus subjected to thermal cycling where both low and high temperatures are encountered. For example, electrical transformers, bushings, rectifiers and the like are subjected to use at both relatively low and high temperatures ranging from subzero to well over 150° C.

A primary problem attending the encapsulation of electrical apparatus with resinous insulation is the widely divergent thermal expansion properties of the metals used in the apparatus and of the resinous insulation. Metals commonly used in electrical apparatus, such as aluminum, copper, and steel, have coefficients of linear thermal expansion which are much lower than those of the existing resinous insulation compositions. During thermal cycling of the insulated apparatus there are thermal stresses imposed which are sufficiently severe to cause cracking of the insulation as well as separation of the metal from the applied resinous composition with ultimate failure of the electrical apparatus.

At the present time, in order to use resinous encapsulating systems, it is necessary to introduce flexilizing agents or very flexible or rubbery resins which tend to relieve these inherent thermal stresses. The disadvantage of employing such flexible systems is that they are usually very poor physically and electrically at elevated temperatures.

It has been recognized that mineral fillers in the resinous insulation result in sime lowering of the thermal expansion of the cured resinous insulation material. Attempts have therefore been made to attain a closer correlation of the thermal expansion properties of the metals and of the resinous insulation. The development of glycidyl polyethers, commonly called epoxy resins, have been of great benefit to the electrical industry and epoxy resins in liquid form have been widely used as encapsulants for electrical apparatus, because of their ability to remain hard and rigid when heated and to withstand cracking upon subzero cooling. However, when the encapsulated metal electrical components are subjected to severe thermal cycling the epoxy insulation inevitably cracks. This has been true even where substantial amounts, such as up to 65% of the mineral filler, have been incorporated in the epoxy resin insulating compositions.

Where the amount of filler added to the resinous composition has been greater than 65% (in an effort to obtain even lower coefficients of thermal expansion), the viscosity of the uncured resinous mixture is increased to such an extent that it cannot be used as a liquid casting resin system in a conventional or economical manner. If the uncured resinous composition is too viscous, it cannot be used as a liquid casting resin system unless pressure is applied in a manner similar to that for molding procedures, However, pressure casting results in problems such as distortion of metal coils and other defects known to those skilled in the art. Such higher viscosity high mineral filler content resinous compositions are usually used as molding compounds instead of liquid casting materials.

Heretofore, the best mineral filled resin compositions when cured have attained coefficients of thermal expansion no lower than $25 \times 10^{-6}$ without sacrificing viscosity. In other words, when the amount of mineral filler is greater than 65% of the resin, the mixture loses its pourability. Other problems also occur such as the inability to remove retained air in an evacuated system which is normally used with liquid casting resinous compositions.

Associated with the foregoing is the problem of the settling of particles of mineral filler during the curing stage and after the pouring or casting stage.

Patent application Serial No. 447,237 deals with resin systems which contain a filler with a controlled particle size distribution which enables more filler to be incorporated into a resinous mixture than one would normally expect. Upon curing these compositions containing high filler loadings have coefficients of thermal expansion that are low and are rigid, and the uncured compositoins are of low viscosity. However, in using resinous compositions incorporating the fillers of applcation Serial No. 447,237, with a controlled particle size distribution, in many instances during cure, the coarser particles tended to settle slightly thereby resulting in a cured resinous composition with varying percentage of filler from the top to the bottom of the casting. This resulted in nonuniformity of properties.

One method tried to avoid the settling problem has been the addition of a suspending agent such as ultrafine $SiO_2$ to a resin composition having fillers therein. The addition of the settling agent has been successful to some extent in avoiding the problem of settling of the mineral filler particles, but it still does not enable the addition of substantially greater percentages of filler to achieve even more desired low coefficient of thermal expansion.

It has been found in accordance with this invention that the foregoing problems may be overcome by the use of over 65% by weight of certain selected mineral filler particles having a predetermined size distribution in liquid epoxy resins. More particularly, it has been found that where very fine particles of a selected mineral filler, such as fused quartz, are added to an epoxy resin composition much greater percentages, up to as much as 75 to 80% of filler may be added to the resin without adversely affecting the viscosity of the uncured resin. As a result of this discovery the liquid resin composition with a high filler content can be used for encapsulating metal parts by liquid casting methods and upon curing, the resinous composition has a coefficient of thermal expansion comparable to that of the metal parts being encapsulated.

Moreover, it has been found that where a selected range of fine particles of a mineral filler such as fused quartz are used there is no problem of settling of the filler during the subsequent curing stage.

Accordingly, it is an object of this invention to provide a crack resistant casting composition encapsulating a metal part having coefficients of thermal expansion comparable to that of the metal part being encapsulated.

It is another object of this invention to provide a crack resistant casting composition for encapsulating metal electrical parts having outstanding thermal shock characteristics.

It is another object of this invention to provide a crack resistant casting composition for encapsulating metal electrical parts having excellent physical properties at elevated temperatures.

Finally, it is an object of this invention to satisfy the foregoing objects and desiderata in a simple and effective manner.

SUMMARY OF THE INVENTION

Briefly, the invention relates to electrical apparatus having a metallic member, the apparatus being subject to cyclical thermal expansion and contraction and the metal member being embedded in a fully cured epoxy resin composition, the embedded member having been made by casting the member in a liquid resinous-filler composition comprising (a) 100 parts by weight of liquid resin selected from the group consisting of aromatic epoxy, novolac epoxy, cycloaliphatic epoxy, and mixtures thereof, said resin having terminal epoxy groups and an epoxy equivalent weight of about 125 to 450, (b) about 350 to 760 parts by weight of powdered mineral filler selected from at least one of the groups consisting of fused quartz, beryl, and lithium aluminum silicate, characterized by a coefficient of linear thermal expansion not greater than about $8 \times 10^{-6}$ inch per inch per degree C, said mineral filler having a particle size distribution such that by weight about 0 to 18% is greater than 30 microns in average size, about 0 to 35% is greater than 20 microns in average size, about 20 to 60% is greater than 10 microns in average size, about 40 to 80% is greater than 4 microns in average size, about 60 to 90% is greater than 2 microns in average size, about 76 to 95% is greater than 1 micron in average size, and about 86 to 100% is greater than 0.4 micron, (c) about 20 to 95 parts by weight of a resin curing agent, and (d) about 0.05–2.0 parts by weight of a resin curing accelerator.

BRIEF DESCRIPTION TO THE DRAWING

FIGURE 1 is an exploded perspective view of a transformer wherein the low and high voltage windings are cast separately and subsequently assembled;

FIGS. 2–5 are vertical sectional views illustrating successive castings and windings involved in the construction of an integral transformer coil assembly;

Figure 7:
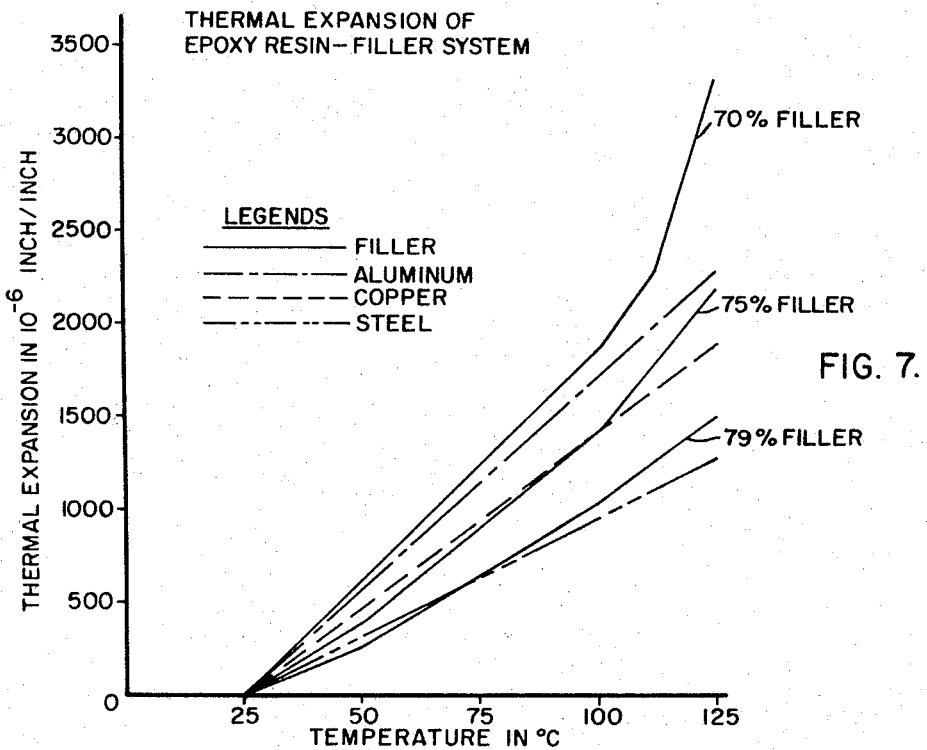
Figure 6:
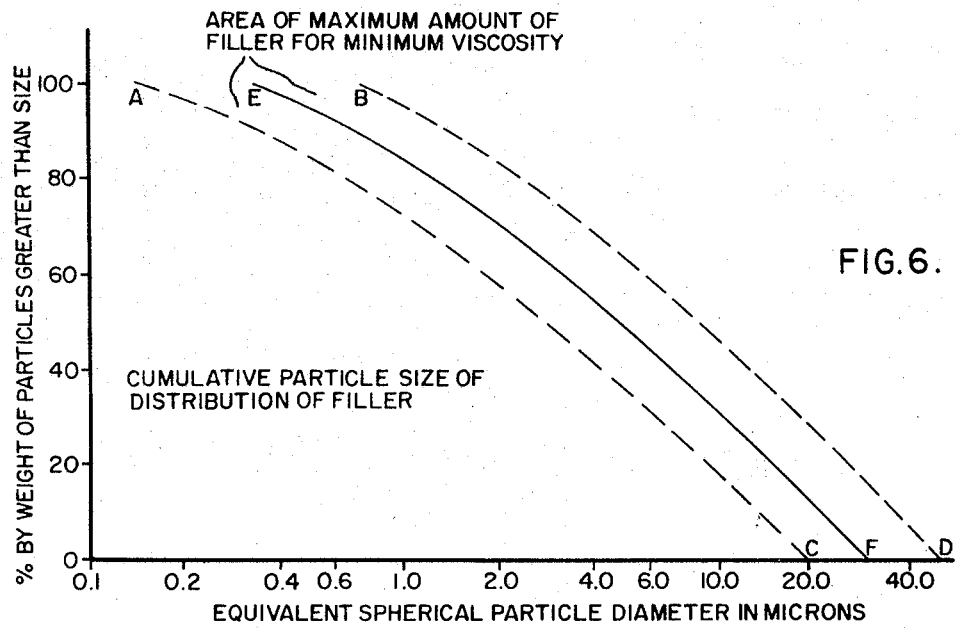

FIG. 6 is a graph showing the preferred particle size distribution as well as range of particle size distribution of mineral filler particles, the preferred particle size distribution being indicated by the solid line and the range of particle size distribution being indicated by the broken lines on opposite sides thereof, the graph being a cumulative logarithmic plot showing in the vertical axis the percentage by weight of particle greater than size and in the horizontal axis the equivalent spherical particle diameter, in microns, of the particle size of the material; and FIG. 7 is a graph showing the thermal expansion of epoxy resin filled system compared with thermal expansions of typical metals used in electrical apparatus, namely steel, copper and aluminum, when plotted against temperature increase in degrees centigrade over the dimensions at 25° C.

DESCRIPTION OF THE PREFERRED EMBODIMENT

As shown in FIG. 1, a low voltage cast coil 10 is embedded in the resinous composition of this invention in one casting operation. Leads 12 and 14 extend from the resinous casting, and circulation ducts 16 extend through the cast element. The cast coil 10 fits into a central bore of a similar precast high voltage coil 18 which has been prepared in a separate casting operation, and the two coils assembled into a single unit. In the alternative, the high voltage coil 18 may be wound directly on the cast low-voltage coil 10 and the assembly is cast in the epoxy resin and filler composition of this invention to provide an integral casting.

For a more complete understanding of the last mentioned multiple casting technique employed, reference is made to FIGS. 2 to 5. In FIG. 2, a foil wound low voltage coil 22 is wound around a form 20 previously prepared from the same filled epoxy resin composition. Coil leads 24 extend upwardly from coil 22. In the next step, shown at FIG. 3, a first cast layer 26 of a liquid resin and filler composition of this invention is cast poured around the coil 22 and the outer extremities of the form 20 using a removable outer mold form, of silicone rubber for instance (not shown), and cured.

As shown in FIG. 4 a high voltage coil 28 is then wound around the resin and filler layer 26. Thereafter an outer resin and filler layer 30 (FIG. 5) is cast around the unit shown in FIG. 4 and cured which results in an integral transformer coil assembly. The high voltage coil 28 is provided with coil leads 32. A transformer produced by such procedure from the resinous compositions of this invention has been subjected to an extensive series of comparative thermal cycling and electrical tests exhibited excellent electrical properties, outstanding strength and rigidity, and complete absence of cracking. It is to be understood that additional windings and casting may be added where more than two coils are required.

The coils 22 and 28 may be composed of wire or foils of conventional transformer metals such as copper or aluminum. The cast resinous composition members 20, 26, and 30 are composed of admixtures of pourable fluids comprising at least 65% of the selected mineral filler and 35% of the epoxy resin and catalyst and cure accelerator which mixture is preferably poured immediately upon heating to temperatures of above 100° C., and cast around the coils 22 and 28, and the composition is cured to a thermoset state by the application of heat preferably from 130° C. to 150° C. The casting operation may be a single step procedure or, in some instances, may comprise two or more pouring and curing steps especially for complex structures.

For use in practicing the present invention, the liquid glycidyl polyether resin may be an epoxy resin and/or an epoxy novolac resin composition. The epoxy resin may be an aromatic or a cycloaliphatic epoxy composition, or mixtures of two or more thereof.

The resinous epoxy and/or epoxy novolac compositions which may be employed in the invention are relatively low viscosity liquids. They may be prepared by reacting predetermined amounts of at least one polyhydric phenol and at least one epihalohydrin in an alkaline medium.

Phenols which are suitable for use in preparing the resinous polymeric epoxides include those which contain at least two phenolic hydroxide groups per molecule. Polynuclear phenols which have been found to be particularly suitable include those wherein the phenol nuclei are joined by carbon bridges, such, for example, as 4,4'-dihydroxy-diphenyl-dimethyl-methane (referred to hereinafter as bisphenol A), 4,4'-dihydroxy-diphenyl-methyl-methane and 4,4'-dihydroxy-diphenyl-methane. In admixture with the named polynuclear phenols, use may also be made of those polynuclear phenols wherein the phenolic nuclei are joined by sulfur bridges such, for example, as 4,4'-dihydroxy-diphenylsulfone.

While it is preferred to use epichlorohydrin as the epihalohydrin in the preparation of the resinous polymeric epoxides of the present invention, homologues thereof, for example, epibromohydrin and the like may also be used advantageously.

In the preparation of the resinous polymeric epoxides, aqueous alkali is employed to combine with the halogen of the epichlorohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide may be employed although it is preferred to use sodium hydroxide since it is relatively inexpensive.

The product of the reaction, instead of being a single simple compound, is generally a complex mixture of glycidyl polyethers, but the principal product may be represented by the formula:

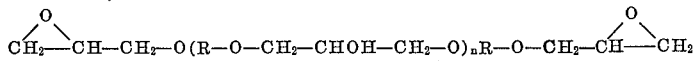

wherein $n$ is an integer of the series 0, 1, 2, 3, and R represents the divalent hydrocarbon radical of the dihydric phenol. While for any single molecule of the polyether $n$ may be 0, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The resinous polymeric epoxide, or glycidyl polyether of a dihydric phenol suitable for use in this invention has a 1,2-epoxy equivalency greater than 1.0. By epoxy equivalency reference is made to the average number of 1,2-epoxide groups:

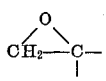

contained in the average molecule of the glycidyl ether. Owing to the method of preparation of the glycidyl polyethers and the fact that they are ordinarily a mixture of chemical compounds having somewhat different molecular weights and containing some compounds wherein the terminal glycidyl radicals are in hydrated form, the epoxy equivalency of the product is not necessarily the integer 2.0. The 1,2-epoxy equivalency of the polyethers is thus a value of up to 2.0

Resinous polymeric epoxides or glycidyl polyethers suitable for use in accordance with the present invention may be prepared by admixing and reacting from one to ten mol proportions of an epihalohydrin, preferably epichlorohydrin, with from one to three mol proportions of bisphenol A in the presence of at least a stoichiometric excess of alkali based on the amount of halogen.

To prepare the resinous polymeric epoxides, aqueous alkali, bisphenol A and epichlorohydrin are introduced into and admixed in a reaction vessel. The aqueous alkali served to dissolve the bisphenol A with the formation of the alkali salts thereof. If desired, the aqueous alkali and bisphenol A may be admixed and the epichlorohydrin added thereto, or an aqueous solution of alkali and bisphenol A may be added to the epichlorohydrin. In any case, the mixture is heated in the vessel to a temperature within the range of from about 80° C. to 110° C. for a period of time varying from about one-half to three hours, or more, depending on the quantity of reactants used.

Upon completion of heating, the reaction mixture separates into layers. The upper aqueous layer is withdrawn and discarded, and the lower layer, containing the desired epoxy, is washed with hot water to remove reacted alkali and halogen salts, in this case, sodium chloride. If desired, dilute acids, for example, acetic acid or hydrochloric acid, may be employed during the washing procedure to neutralize the excess alkali.

The liquid glycidyl polyethers suitable for use in accordance with the present invention may also be defined in terms of their epoxy equivalent weight. This value is derived by dividing the molecular weight of the composition by the average epoxy equivalency of the polyether. For the present invention epoxy resins having epoxy equivalent weights within the range of about 125 to about 450 are employed. Within this range, the preferred equivalent weight is from about 125 to about 250. Values above 250 result in relatively high viscosities and are therefore less desirable.

The glycidyl polyether-novolac resins suitable for combining with and for curing by catalysts in accordance with this invention are prepared by condensing an epihalohydrin with a novolac resin of an aldehyde and a monohydric mononuclear alkyl phenol containing at least four carbon atoms in the alkyl group, which novolac resin contains about three to twelve phenolic hydroxyl groups per average molecule. The term "novolac" as used herein refers to phenolaldehyde resins prepared by reacting at least one phenol with at least one aldehyde in the ratio of 1 mol of phenol to from about 0.5 to 0.85 mol of aldehyde using an acidic catalyst. The condensation is effected by mixing the novolac resin with at least 3 mols of an epihalohydrin such an epichlorohydrin per phenolic hydroxyl equivalent of novolac resin and with addition of about 1 mol of alkali metal hydroxide per phenolic hydroxyl equivalent of novolac resin. The reaction mixture is maintained within the range of about 60° C. to 150° C. during the ensuing reaction. Upon completion of the reaction, the formed alkali metal salt and any unreacted hydroxide are removed fom the resulting epoxy-novolac resin and the resultant epoxy-novolac, in the form of a viscous liquid or solid, is separated from the reaction mixture and may be purified, if required.

The obtained epoxy-novolac resin may vary from very viscous liquids to solids at normal temperatures (20° C.). Even the normal solid resins are fusible. The resins have a very complicated chemical structure. Analysis indicates that the majority such as about 60 to 90 or more percent of the hydrogen atoms of the phenolic hydroxyl group of the original novolac resin are replaced by glycidyl radicals. The epoxy-novolac resins also contain an appreciable proportion of alcoholic hydroxyl groups which are largely present in 2,3-dihydroxyl-propyl radicals that have replaced hydrogen atoms of phenolic hydroxyl groups of the original novolac resin. A small proportion of chlorine is contained in the resin, some of which is present in 3-chloro-2-hydroxyl propyl groups and some in more complicated groups which are 3-chloro-2-(3-chloro-2-hydroxyl-propyloxy) propyl and 3-chloro-2-(2,3-epoxy-propyloxy) propyl radicals linked to the phenolic ether oxygen atoms in the epoxy resin. The product may contain an insignificant amount of phenolic hydroxyl groups, i.e., at most, less than about 0.3 per molecule on the average.

The glycidyl polyethers of this invention are cured by reaction with certain selected anhydrides. Specifically, the anhydrides which may be employed are hexahydrophthalic anhydride, tetrahydrophthalic anhydride, and mixtures or eutectic thereof. The anhydrides are used in amounts of about 20 to 95 parts by weight for each 100 parts by weight of epoxy resins and/or epoxy novolac. Other anhydrides, such as phthalic, maleic, and methyl nadic anhydride, may also be present in small amounts up to about 20% by weight of the primary anhydrides.

In order that the glycidyl polyether-anhydride mixture may be cured within reasonable periods of time at temperatures of about 130° to 150° C., it is desirable to employ a small amount, within the range of about 0.05 to 2.0 parts by weight, of a curing accelerator for each 100 parts of the glycidyl polyether. The accelerators are selected from the group consisting of organic amines, metal amine chelates, amine borates, imidazoles, Lewis acids and Lewis bases, and polyborate esters. One or more of the accelerators may be employed simultaneously. Examples of suitable amines include monoethanolamine, piperidine, diethanolamine, triethanolamine, ethylenediamine, diethylenetriamine, dimethylaminopropylamine, pyrrolidine, and dimethylaminomethyl phenol. The metallic amine chelates which may form a portion of the curing catalyst of this invention may be prepared by initially reacting one mol of metal ester, having the general formula $M(OR)_4$, in which R is 1 to 4 carbon atoms, with two mols of triethanolamine and distilling off two mols of the resulting low boiling alcohol having the formula ROH where R represents the organic radical in the metal ester. Suitable metallic amine chelates which may be used in this invention include titanium amine chelate, aluminum amine chelate and silicon amine chelate. Particularly satisfactory results have been achieved when the metal amine chelate of this invention is titanium amine chelate.

The polyborate esters used in conjunction with the titanium amine chelate are well known in the art and are described in detail in U.S. Patent No. 2,941,981 to Elbling et al. Particularly satisfactory results have been achieved by using the polyborate ester-trihexylene glycol biborate.

In addition to the resinous epoxy and epoxy-novolac compositions set forth above certain cycloaliphatic epoxy compounds may also be used in accordance with this invention.

The cycloaliphatic 1,2-epoxy compounds having an epoxide equivalence greater than 1, used as starting materials, are compounds which contain, calculated for the average molecular weight, $n$ groups of the formula

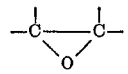

where $n$ is a whole or fractional number greater than 1. The 1,2-epoxide groups may be either terminal or inner ones. Particularly suitable terminal 1,2-epoxide groups are 1,2-epoxy-ethyl or 1,2-epoxypropyl groups. Preferably, they are 1,2-epoxyproply groups linked to an oxygen atom, that is to say there are glycidylether or glycidylester groups.

As examples of cycloaliphatic polyepoxides containing only terminal 1,2-epoxide groups there may be mentioned the compounds of the following formulae

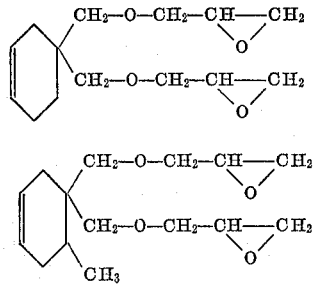

as well as the halogenated epoxy compounds of the formulae

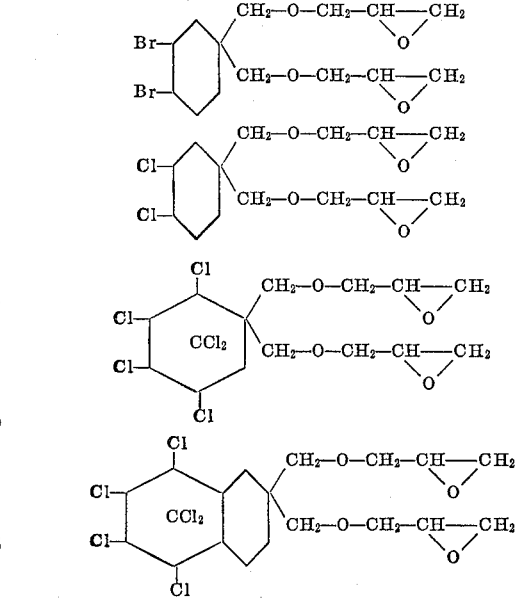

When such halogenated, more especially chlorinated or brominated polyepoxides, are used exclusively or concomitantly, the resulting cured resins have in addition flame-inhibiting properties.

Compounds with inner epoxide groups contain at least one 1,2-epoxide group in an aliphatic chain

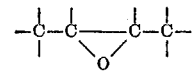

or a cycloaliphatic ring.

Particularly good results are obtained by using cycloaliphatic polyepoxy compounds that contain at least one inner 1,2-epoxide group attached to a cycloaliphatic ring. There may be mentioned, for example, epoxidized cyclic dienes such as 1,2:4,5-diepoxycyclohexane, dicyclopentadient diepoxide, limonene diepoxide and vinylcyclohexene diepoxide; also cycloaliphatic epoxyethers, epoxyesters and epoxyacetals containing at least one cycloaliphatic 5-membered or 6-membered ring, to which at least one 1,2-epoxide group is attached, for example the compounds of the following formulae:

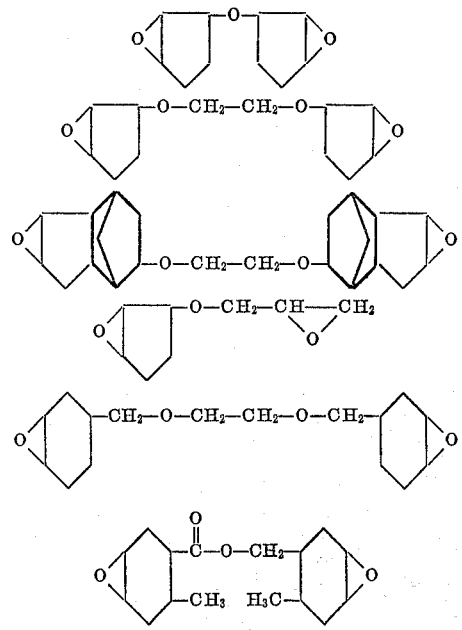

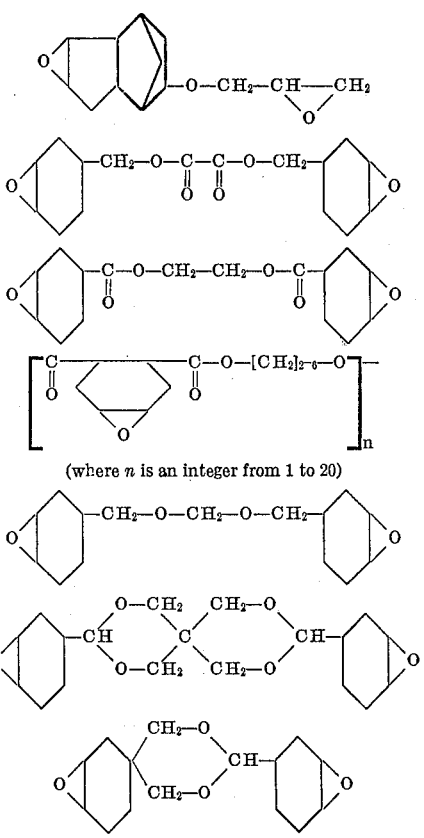

(where n is an integer from 1 to 20)

Additionally for use in the invention, there are suitable telomers containing epoxide groups, such as are obtained by telomerization of ethylenically unsaturated monoepoxides of the cycloaliphatic series, such as 3,4-epoxytetrahydrodicyclopentadienyl-8-allyl ethers of 3-vinyl- 2,4-dioxo-spiro (5,5)-9,10-epoxyundecane with telogens such as carbon tetrachloride, dimethylposphite or cyclohexanone, in the presence of an organic peroxide.

To the cycloaliphatic polyepoxy compound there may be added as active diluent a cycloaliphatic monepoxide such as vinylcyclohexene monoxide, 3,4-epoxytetrahydrodicyclopentadienol-8, 3,4-epoxyhexahydrobenzal glycerol, or 3,4- epoxycyclohexane-1,1-dimethanol acrolein acetal.

Preferably used curing agents are rycloaliphatic polycarboxylic acid anhydrides which, if desired, may be halogenated, such as tetrahydrophthalic anhydride, hexahydrophthalic anhydride, endomethylenetetrahydrophthalic anhydride, methylendomethylenetetrahydrophthalic anhydride (methylnadic anhydride) or hexachloroendomethylene tetrahydrophthalic anhydride.

Further suitable are aliphatic polycarboxylic acid anhydrides, for example glutaric, succinic polyadipic, maleic, itaconic or aconitic acid anhydride; allylsuccinic, pentenylsuccinic, hexenylsuccinic, dodecenylsuccinic anhydride; vinyloxysuccinic, 7 - allybicyclo-(2,2,1)-hept-5-ene-2,3-dicarboxylic, 7-octenylbicyclo-(2,2,1)-hept-5-ene-2,3-dicarboxylic, and methyl-7-allylbicyclo-(2,2,1)-hept-5-ene-2,3-dicarboxylic acid anhydrides.

With these anhydrides, there may be further used an accelerator, such as a tertiary amine, or a salt or quanternary ammonium compound thereof, or an alkali metal alcoholate.

In carrying out the casting procedure of the present invention, there is admixed, for each 100 parts by weight of the selected epoxy resin, about 350 to 760 parts by weight of the powdered fused quartz filler in a predetermined particle size, about 50 to about 95 parts by weight of the selected anhydride or anhydride mixture, and from about 0.05 to about 2.0 parts by weight of the selected curing accelerator. Fused quartz will be specifically referred to hereafter, but beryl and lithium aluminum silicate can be substituted therefor in equal amounts with similar results. The mixture is heated in about 100° C. It has been found that the combination of anhydride with the epoxy base resin produces a very fluid system at temperatures of from 90° to 100° C. The heated mixture is then poured around the particular electrical element to be encapsulated, in a suitable mold, and is baked at about 100° to 150° C. for about 4–20 hours followed by a post-cure of about an equivalent time period of 150° to 180° C. The combination of relatively low viscosity-anhydride cured epoxy resin filled with about 65% or more by weight of fused quartz filler in the predetermined particle sizes produced a cured, rigid resin characterized by excellent electrical and physical properties and which has a coefficient of thermal expansion low enough that the combination of these properties is productive of a resin with very excellent crack resistance even when in contact with massive metal components, such as large copper studs in bushings.

In accordance with this invention the amount of powdered fuse quartz in the predetermined particle sizes that can be added to a resinous compound can be increased to about 80% of the composition as compared to amounts of from 60% to 65% which latter range was heretofore regarded as the maximum practicable. As was stated above the advantage of the increased amount of filler is an unexpected resultant reduction in the coefficient of thermal expansion of the resulting filled resin composition. In Table I the preferred cumulative particle size distribution is shown with upper and lower limits for fused quartz.

TABLE I.—CUMULATIVE PARTICLE SIZE DISTRIBUTION LIMITS OF FILLER (FUSED QUARTZ)

| Particle Size Micron ($\mu$) | Weight Percent Greater Than Size | |
|---|---|---|
| | Range | Preferred Mix |
| 0.4 | 86–100 | 94 |
| 1.0 | 76–95 | 82 |
| 2.0 | 60–90 | 70 |
| 4.0 | 40–80 | 56 |
| 10.0 | 20–60 | 34 |
| 20.0 | 0–35 | 12 |
| 30.0 | 0–18 | 0 |

A comminuted filler such as fused quartz is normally composed of particles varying in size. In Table I the preferred mixture of fused quartz for the desired particle sizes in microns is shown which particle sizes range from 0.4 micron to 30.0 microns. The weight range of the fused quartz mixture are also listed for the various particle sizes. In FIG. 6 of the drawings, the preferred mix is shown in the solid line with the ranges on either side shown in broken line. The areas of the graph of FIG. 1 above and below the extremes of the ranges are not effective for the practice of the invention. In other words, one should select the amount of the filler having a particle size for minimum viscosity of the resinous epoxy composition within the area between the broken lines of the chart. A particle size distribution above the upper curve of the particle size distribution is unsatisfactory because the viscosity of the resinous epoxy composition is increased substantially.

On the other hand where the cumulative particle size distribution of the fused quartz filler is less than that shown by the lower broken line, that is, to the left of the range shown in FIG. 6, the resinous epoxy composition also loses its low or minimum viscosity and is not practically usable as a casting resin. Thus using the fillers in the particle sizes ranging from 0.4 to 30.0 microns in the weight percentages indicated in the Table I as shown in FIG. 6, in amounts of from 65% to 80% of the composition, have been found to serve satisfactorily in a liquid resinous epoxy composition and upon being fully cured, it will possess coefficients of thermal expansion substantially equal to that of metals which are encapsulated within the solidified or cured resin.

In Table II the coefficients of thermal expansion for some materials are listed:

*Table II.—Coefficient of thermal expansion values of some materials (between 25° C. to 100° C.) ($\times 10^{-6}$ in./in./° C.)*

| | |
|---|---|
| Steel | 12 |
| Copper | 18 |
| Aluminum | 22 |
| Fused quartz | 0.5 |
| Epoxy resins | 50 to 150 |
| Filler (70%) in epoxy resin | 24 |
| Filler (75%) in epoxy resin | 18 |
| Filler (79%) in epoxy resin | 13.3 |

The metals most commonly encapsulated in a resinous composition are steel, copper and aluminum having coefficients of thermal expansion ranging from 12 to $22 \times 10^{-6}$ in./in./° C. As shown in Table II epoxy resins have a coefficient of thermal expansion ranging from 50 to $150 \times 10^{-6}$ in./in./° C. depending upon the composition. Fused quartz has a coefficient of $0.5 \times 10^{-6}$ in./in./° C. Accordingly, when substantial amounts of finely divided fused quartz, such as 70, 75, or 79% are added to the resin the coefficient of thermal expansion is greatly reduced as shown in the table. The chart in FIG. 7 shows the thermal expansion of an epoxy resin and filler system having 70, 75 and 79% filler added. It is readily apparent from FIG. 7 that in accordance with this invention a resin and finely divided filler system can be made to have a coefficient of thermal expansion substantially equal to the metal being encapsulated.

The following examples are illustrative of the present invention:

EXAMPLE I

Six specimens of resin with hardener, accelerator, and filler were prepared as indicated in Table III. In each example the quantity of fused quartz filler only was varied so that the percent of filler varied from 75 to 80% as shown in the table. The components of each example were mixed and poured at 100° C. and cured for 16 hours at that temperature after which each was postcured for 16 hours at 150° C.

The particle size of the fused quartz filler is the same as described in Table I. As shown in Table III the viscosity values of the several specimens are not abnormally high even for the specimen "f" having 80% filler. Moreover, all of the specimens show excellent tensile properties at 100° and 135° C. Similarly good results are had by substituting beryl and lithium aluminum silicate for the fused quartz in each of the above formulations.

EXAMPLE II

Another specimen including a cycloaliphatic epoxy resin filled with fused quartz was prepared in accordance with the following formulation, the ingredients of which were mixed and poured at 100° C. and cured for 16 hours at that temperature after which a postcure of 16 hours at 150° C. was carried out.

*Table IV*

| Components: | Parts |
|---|---|
| 3,4 - epoxy - cyclohexylmethyl - 3,4 - epoxycyclohexanecarboxylate | 100 |
| Hexahydrophthalic anhydride | 94 |
| Ethylene glycol | 2 |
| Dimethyl amino methyl phenol | .2 |
| Fused quartz filler | 588 |
| Percent filler | ~75 |

Viscosity at 100° C., 5,000 centipoises.
Pot life at 100° C., 1 hour.
Coefficient of thermal expansion of cured resin (measured 25° C. to 125° C.) $25 \times 10^{-6}$ in./in./° C.

As shown in the foregoing the 75% filler of fused quartz having a particle size described above when added to a cycloaliphatic epoxy resin results in a viscosity at 100 C. of 5,000 centipoises with a coefficient of thermal expansion of the cured composition of $25 \times 10^{-6}$ in./in/° C. which is substantially equal to that of aluminum.

EXAMPLE III

Another specimen containing bisphenol A epoxy resin cured with an aromatic dianhydride filled with fused quartz filler as detailed in Table V, was prepared by mixing and pouring the mixture at 60° C. The system was then cured for four hours at 60° C. followed by a postcure of 16 hours at 125° C.

*Table V*

| Components: | Parts |
|---|---|
| Bisphenol A Resin (same as Examples 1 to 6) | 50 |
| Bisphenol A Resin diluted by butyl glycidyl | 50 |
| Eutectic mixture of metaphenylene diamine and of 4,4'-methylenedianiline | 20 |
| Fused quartz | 294 |
| Percent filler | 71 |

Viscosity at 60° C., 37,000 centipoises.
Pot life at 60° C., 1 hours.
Coefficient of thermal expansion of cured resin (measured between 25° C. to 125° C.) $25 \times 10^{-6}$ in./in./° C.

TABLE III

| Components | Parts by weight | | | | | |
|---|---|---|---|---|---|---|
| | a | b | c | d | e | f |
| Bisphenol A resin [1] | 100 | 100 | 100 | 100 | 100 | 100 |
| Hexahydrophthalic anhydride (hardener) | 80 | 80 | 80 | 80 | 80 | 80 |
| Dimethyl amino methyl phenol (accelerator) | .18 | .18 | .18 | .18 | .18 | .18 |
| Fused quartz filler | 540 | 570 | 604 | 638 | 687 | 720 |
| Percent Filler | 75 | 76 | 77 | 78 | 79 | 80 |
| Viscosity of Composition at 100° C. (cps.): | | | | | | |
| 10 r.p.m | 3,000 | 3,000 | 3,000 | 4,700 | 8,000 | 15,500 |
| 20 r.p.m | 2,000 | 2,000 | 2,250 | 4,250 | 7,000 | 13,000 |
| 50 r.p.m | 1,800 | 1,800 | 2,800 | 4,600 | 7,000 | 12,300 |
| Tensile Properties of cured Composition at 100° C.: | | | | | | |
| Tensile Strength (p.s.i.) | 7,690 | 8,600 | 7,000 | 9,500 | 9,150 | 9,700 |
| Elongation (percent) | 1.48 | 1.58 | 0.84 | 1.00 | 1.15 | 3.2 |
| Modulus$\times 10^6$ | 1.59 | 1.18 | 1.57 | 2.07 | 2.10 | |
| Tensile Properties of cured Composition at 135° C.: | | | | | | |
| Tensile Strength (p.s.i.) | 4,416 | 2,250 | | 3,210 | 2,580 | 3,500 |
| Elongation (percent) | 2.28 | 1.77 | | 1.42 | 1.30 | 3.1 |
| Modulus$\times 10^6$ | 1.22 | 1.33 | | 0.23 | 0.17 | |

[1] Diepoxide derived by reacting about ten mols of epichlorohydrin with one mol of bisphenol A, the diphenol having an epoxide equivalent of 180 to 200. A suitable process for producing such diepoxide is detailed in Example L-1 of U.S. Patent No. 2,735,829.

Here, again, an epoxy resin composition having 71% fused quartz filler of the particle size described above provides a cured specimen having a viscosity of 37,000 centipoises and having a coefficient of thermal expansion of $25 \times 10^{-6}$ in./in./° C.

Accordingly, the epoxy resins may be filled with from 70% to 80% of fused quartz where the filler has the appropriate particle size without detrimentally affecting the viscosity and therefore the pourability of the resin.

At the same time the resin has a sufficiently low viscosity to permit the removal of entrained air by evacuation under normal vacuum pouring conditions. Moreover, where the resin is filled with a filler having a sufficiently low particle size a particle suspension agent need not be added to the mixture to prevent settling of the larger particles during curing. Finally, filler materials other than fused quartz may be used where they have a sufficiently small cumulative particle size. Such fillers may include beryl, and lithium aluminum silicate.

It will be understood that the above specification and drawings are merely exemplary and not in limitation of the invention.

What is claimed is:

1. A liquid resinous filled casting composition comprising by weight (a) 100 parts of thermosettable liquid epoxy resin having terminal epoxy groups and an epoxy equivalent weight of about 125 to 450, (b) about 350 to 760 parts of a mineral filler, (c) about 20 to 95 parts of a resin curing agent, (d) about 0.50 to 2.0 parts of a resin curing accelerator, the filler being at least one of the materials selected from a group consisting of fused quartz, beryl, and lithium aluminum silicate, which has a coefficient of expansion of not over $8 \times 10^{-6}$, and the mineral filler having a cumulative particle size distribution such that by weight up to 18% is greater than 30 microns, up to 35% is greater than 20 microns, about 20 to 60% is greater than 10 microns, about 40 to 80% is greater than 4 microns, about 60 to 90% is greater than 2 microns, about 76 to 95% is greater than 1 micron, and about 86 to 100% by weight is greater than 0.4 micron.

2. The liquid resinous filled casting composition of claim 1 in which the mineral filler is fused quartz.

3. The liquid resinous filled casting composition of claim 1 in which the epoxy resin is selected from a group consisting of aromatic epoxy, novolac epoxy, cycloaliphatic epoxy and mixtures thereof.

4. The liquid resinous filled casting composition of claim 1 in which the filler has a cumulative particle size distribution such that, by weight about 12% is greater than 20 microns, about 34% is greater than 10 microns, about 56% is greater than 4 microns, about 70% is greater than 2 microns, about 82% is greater than 1 micron, and about 95% is greater than 0.4 micron.

5. The liquid resinous filled casting composition of claim 1 having when cured a coefficient of thermal expansion of at least $12 \times 10^{-6}$ in./in./° C.

6. The liquid resinous filled casting composition of claim 1 in which the filler has a cumulative particle size distribution within the area defined by ABCD of FIG. 6.

7. The liquid resinous filled casting composition of claim 1 in which the filler has a cumulative particle size distribution defined by the curve EF of FIG. 6.

8. Electrical apparatus comprising a metal member and a cured epoxy resinous composition encapsulating at least a portion of the metal member, the cured epoxy resinous composition containing a high proportion of mineral filler derived by curing the composition of claim 1, and characterized by a low coefficient of thermal expansion whereby the composition adheres to the metal member and does not separate or break under thermal cycling during use of the electrical apparatus.

9. The apparatus of claim 8 wherein the metal member is the coil of an electrical transformer.

10. The apparatus of claim 8 wherein the metal member is the electrical conductor of a bushing.

11. The apparatus of claim 8 wherein the metal member comprises turns of an electrical coil.

12. The apparatus of claim 11 wherein the electrical coil comprises wound metal foil.

References Cited

UNITED STATES PATENTS 3,328,339    6/1967    Tierney _____ 260—37

FOREIGN PATENTS 1,267,518    6/1961    France.
1,151,377    7/1963    Germany.
1,151,376    7/1963    Germany.
  917,036    1/1963    Great Britain.

ALLAN LIEBERMAN, *Primary Examiner.*

L. JACOBS, *Assistant Examiner.*

U.S. Cl. X.R.

174—110; 260—37, 57, 2

UNITED STATES PATENT OFFICE
CERTIFICATE OF CORRECTION

Patent No. 3,434,087     Dated March 18, 1969

Inventor(s) Charles F. Hofmann

It is certified that error appears in the above-identified patent and that said Letters Patent are hereby corrected as shown below:

Column 13, line 20, change "0.50" to -- 0.05 --.

Signed and sealed this 25th day of January 1972.

(SEAL)
Attest:

EDWARD M. FLETCHER, JR.
Attesting Officer

ROBERT GOTTSCHALK
Commissioner of Patents